Patented Feb. 14, 1933

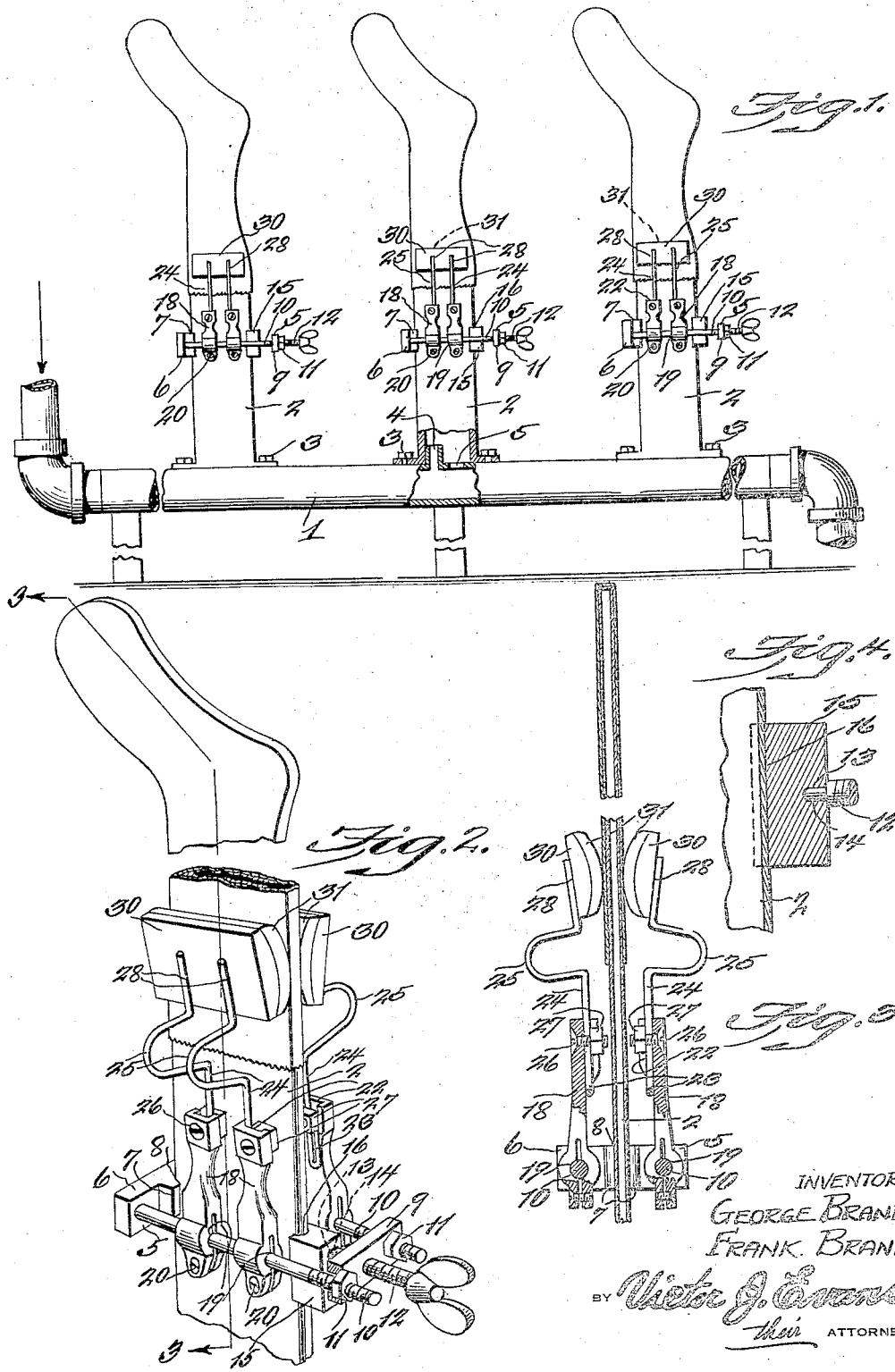

1,897,886

UNITED STATES PATENT OFFICE

FRANK BRAND AND GEORGE BRAND, OF PHILADELPHIA, PENNSYLVANIA

HOSIERY BOARDING FORM AND HOSE CLAMP THEREFOR

Application filed August 4, 1931. Serial No. 555,119.

The present invention relates to a hose boarding form for various hosiery and an improved clamp for retaining the hose on the form and in a stretched condition.

In the devices heretofore used the clamps are either operated by a lever for opening the clamps, or by some other such similar means, requiring substantial time and labor for boarding hose.

It is therefore the purpose of the present invention to provide, in a device of this kind a pair of opposed tensioned clamps, supported by a frame or a hose boarding form, and in such a manner that an operator's hands or the fingers thereof may pass between the clamps and the boarding form, when stretching the hose on the form, thereby facilitating the work and thereby considerably increasing the output of finished hosiery.

Another purpose of the invention is to provide a boarding form, wherein the opposite clamps have felt faces for gripping against the hose on the form to keep the same stretched.

In addition to these features as well as a quicker way for boarding hose, it saves in the quantity of yarn or silk thread or any other material of which the hose is made. The fact is at least two or three links or courses can be eliminated in knitting the hose, originally making a shorter hose, and when placed on the boarding form the hose can be stretched a greater distance to make up for the elimination of the two or three courses or links in the hose.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view of a portion of the usual manifold for admitting steam into the hollow boarding forms, showing a plurality of forms mounted thereon.

Figure 2 is a perspective view of one of the forms showing the clamps for the hose.

Figure 3 is a vertical sectional view on line 3—3 of Figure 2.

Figure 4 is a sectional view showing the mounting of the screw 12 on the clamp 15.

Referring to the drawing 1 identifies a conventional type of manifold, through which steam passes, and 2 are boarding forms, which are bolted or otherwise fastened at 3 to the manifold. These boarding forms are hollow and communicate with the manifold. Nozzles 4 carry steam into the boarding forms, while the openings 5 carry off the condensation of steam. In this way the boarding forms are heated, for the purpose of drying the hose.

The hose are pulled upon the forms as illustrated and held stretched until they are dry, then they are removed and laid out flat.

Mounted on the forms are frames for the support of clamps, which are used to hold the hose stretched. Each frame 5 comprises a transverse clamp 6 at one end, there being a rib 7 provided with a groove 8 for the reception of the curved edge of the form. The frame also comprises a transverse piece 9 at the other end, through which the threaded ends of transverse rods 10 loosely engage, the other ends of the rods 10 being fixed in the transverse clamp 6. Lock nuts 11 engage with the threaded ends of the rods 10 for the purpose of locking the parts together. The thumb screw 12 is threaded through the transverse piece 9 and has a reduced end 13, which loosely engages a socket 14 in a clamp 15. This clamp 15 has a groove 16 engaging the opposite edge of the boarding form, and by tightening up on the thumb screw the frame is held secure by means of the clamps engaging the opposite edges of the form.

Arms 18 are provided and have split bearings 19 at their lower ends held frictionally clamped on the rods 10 by means of the screws 20. The faces of the arms adjacent the opposite faces of the boarding forms are channeled as shown at 22 for the reception of the looped ends 23 of the spring arms 24 which have the curved arched portions 25. Suitable screw bolts and nuts 26 and 27 hold the looped ends of the spring rods in the channels of the arms 18.

The upper ends of the spring arms are spot welded or otherwise suitably fastened at 28 to the clamps 30, which are made preferably of aluminum, though not necessarily, for these clamps can be made of any other material or any other metal. However the faces of the clamps 30 have felt pads 31 adhesively or otherwise fastened thereto. The felt pads frictionally bear on opposite sides of the hose for the purpose of holding the hose stretched, so that when the hose is removed and laid out flat it will retain its shape.

In order to board the hose, the hose is fitted on to the form as is shown. In fitting the hose on the form, the leg portion, after properly positioning the foot portion, is stretched, pulled down, and in stretching the leg portion the thumb and fingers of the operator's hands simply move between the felt faced clamps and the boarding form, and the clamps will automatically spring into operative position. In removing the hose, the leg portion of the hose is simply pulled from between the clamps, then the hose may be easily pulled off the foot portion of the form. By this construction the lever, foot pedal or otherwise operated clamps for boarding forms are eliminated.

The invention having been set forth, what is claimed is:

1. The combination with a boarding form, of a frame mounted upon the form and having opposed clamps to engage the opposite edges of the form, and means for holding the frame fixed, arms carried by opposite sides of the frame, spring arms carried by the first arms on opposite sides of the form, means for fixedly adjusting the first arms, whereby the tension of the spring arms toward opposite sides of the form may be regulated, and felt face clamps fixed to the free ends of the spring arms, adapted to engage opposite sides of the hose adjacent opposite sides of the form.

2. The combination with a hose boarding form, of a frame having transverse rods and being fixed relatively to the form, arms fixed to said rods and extending upwardly, spring arms carried by the first arms, means carried by the first arms and cooperating with the rods for holding the first arms fixedly adjustable on the rods, whereby the tension of the spring arms toward the sides of the form may be regulated, and opposed clamps fixed to the free ends of the spring arms and adapted to bear frictionally against opposite sides of a hose fitted on the form.

3. The combination with a hose boarding form, of a frame provided with opposite transverse rods on opposite sides of the form, means at the opposite ends of the frame for clamping the frame fixed relatively to the form, arms extending upwardly from the rods, said arms having channels at their free ends adjacent opposite faces of the form, spring arms fixed in said channels of the first arms, means carried by the first arms and cooperating with the rods for holding the first arms fixedly adjustable on the rods, whereby the tension of the spring arms toward the opposite sides of the form may be regulated, and opposed clamps carried by the free ends of the spring arms and adapted to engage opposite portions of the hose to hold the same stretched.

4. The combination with a hose boarding form, of a frame having opposed transverse rods, said frame having end transverse pieces, one being fixed to the rods and having a grooved rib engaging one edge of the form, the other transverse piece loosely receiving said rods, with means associated with the rods and the second transverse piece to hold the latter fixed, a thumb screw engaged through the last mentioned cross piece and having a loosely connected clamp grooved to receive the opposite edge of said form, arms fixed to the rods, spring arms fixed to the first arms, and opposed felt faced clamps carried by the ends of the spring arms and adapted to engage opposite portions of hose fitted upon the form.

In testimony whereof we affix our signatures.

GEORGE BRAND.
FRANK BRAND.